United States Patent
Tadano

(10) Patent No.: US 10,907,979 B2
(45) Date of Patent: Feb. 2, 2021

(54) GUIDANCE ASSISTANCE SYSTEM, GUIDANCE ASSISTANCE METHOD, AND COMPUTER-READABLE RECORDING MEDIUM

(71) Applicant: NEC Corporation, Tokyo (JP)

(72) Inventor: Kumiko Tadano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1 day.

(21) Appl. No.: 16/528,744

(22) Filed: Aug. 1, 2019

(65) Prior Publication Data

US 2019/0353490 A1   Nov. 21, 2019

Related U.S. Application Data

(63) Continuation of application No. 15/564,467, filed as application No. PCT/JP2016/062187 on Apr. 11, 2016, now Pat. No. 10,663,307.

(30) Foreign Application Priority Data

Apr. 13, 2015  (JP) ................................. 2015-081701

(51) Int. Cl.
*G01C 21/34* (2006.01)
*G08B 7/06* (2006.01)
(Continued)

(52) U.S. Cl.
CPC ......... *G01C 21/3415* (2013.01); *G01C 21/20* (2013.01); *G01C 21/3461* (2013.01);
(Continued)

(58) Field of Classification Search
CPC .......................... G01C 21/3415; G01C 21/20; G01C 21/3605; G01C 21/3461; G01C 21/3697; G08B 7/066
(Continued)

(56) References Cited

U.S. PATENT DOCUMENTS 7,924,149 B2   4/2011   Mendelson
8,009,035 B1   8/2011   Vallaire
(Continued)

FOREIGN PATENT DOCUMENTS

JP   H08-030193 A   2/1996
JP   2001-116574 A   4/2001
(Continued)

OTHER PUBLICATIONS

U.S. Office Action for U.S. Appl. No. 15/564,467 dated Aug. 21, 2019.
(Continued)

*Primary Examiner* — Jaime Figueroa

(57) ABSTRACT

A guidance assistance system and the like for reducing an influence on a deviation of a crowd from a travel route are provided.
The guidance assistance system includes deviation risk evaluation means for deriving a deviation risk representing an influence on a deviation of a crowd from a travel route at a predetermined point on the travel route based on information relating to circumstances of the travel route and a route related to the travel route, and priority order determining means for determining an order of priority relating to arrangement of a guide sign that guides the crowd based on the deviation risk.

12 Claims, 11 Drawing Sheets

(51) Int. Cl.
  *G01C 21/20* (2006.01)
  *G01C 21/36* (2006.01)
(52) U.S. Cl.
  CPC ..... *G01C 21/3605* (2013.01); *G01C 21/3697* (2013.01); *G08B 7/066* (2013.01)
(58) Field of Classification Search
  USPC .................................................. 701/1, 533
  See application file for complete search history.

(56) References Cited

U.S. PATENT DOCUMENTS

| | | | |
|---|---|---|---|
| 2006/0247849 A1 | 11/2006 | Mohsini et al. | |
| 2009/0138353 A1 | 5/2009 | Mendelson | |
| 2010/0100510 A1 | 4/2010 | Balaban et al. | |
| 2010/0121567 A1 | 5/2010 | Mendelson | |
| 2010/0222046 A1* | 9/2010 | Cumming | G06Q 30/02 455/418 |
| 2010/0228574 A1* | 9/2010 | Mundinger | G01C 21/3423 705/4 |
| 2012/0047083 A1 | 2/2012 | Qiao et al. | |
| 2014/0293865 A1 | 10/2014 | Shi et al. | |
| 2014/0335893 A1 | 11/2014 | Ronen | |
| 2015/0039364 A1 | 2/2015 | Beraudier et al. | |
| 2015/0264547 A1 | 9/2015 | Kobayashi | |
| 2016/0042615 A1 | 2/2016 | Turner et al. | |
| 2016/0047663 A1 | 2/2016 | Iyer et al. | |
| 2016/0269882 A1 | 9/2016 | Balthasar et al. | |
| 2016/0314554 A1 | 10/2016 | Pillac et al. | |

FOREIGN PATENT DOCUMENTS

| | | | |
|---|---|---|---|
| JP | 2004-125529 A | | 4/2004 |
| JP | 2005-234768 A | | 9/2005 |
| JP | 2009-009233 A | | 1/2009 |
| JP | 2009-270900 A | | 11/2009 |
| JP | 2011-174834 A | | 9/2011 |
| JP | 2013-164695 A | | 8/2013 |
| JP | 2017101992 A | * | 6/2017 |
| WO | 2007/122960 A1 | | 11/2007 |

OTHER PUBLICATIONS

Japanese Office Action for JP Application No. 2017-512608 dated Nov. 12, 2019 with English Translation.
Hiroshi Sugiyama et al., "A Pedestrian Route Guidance System Based on Navigation Demand Model", The IEICE Transactions on Fundamentals of Electronics, Communications and Computer Sciences (Japanese), Jan. 2004, vol. J87-A, No. 1, p. 59 to 67.
International Search Report dated Jul. 5, 2016, in counterpart International Application No. PCT/JP2016/062187.
Written Opinion of the International Searching Authority dated Jul. 5, 2016, in counterpart International Application No. PCT/JP2016/062187.

* cited by examiner (A) EXAMPLE OF ROUTE (B) EXAMPLE OF LINK INCLUDED

| LINK | START POINT | END POINT | DISTANCE OF LINKS |
|---|---|---|---|
| L1 | A | B | 10 |
| L2 | B | C | 10 |
| L3 | B | C | 30 |
| L4 | B | C | 90 |
| L5 | C | D | 10 |
| L6 | C | D | 20 |

(C) EXAMPLE OF EVACUEE

| CROWD | DEPARTURE POINT | DESTINATION |
|---|---|---|
| POPULATION OF A DISTRICT | A | D |

(D) NUMBER OF EVACUEES

| CROWD | NUMBER |
|---|---|
| POPULATION OF A DISTRICT | 1000 PEOPLE |

(E) TRAVEL ROUTE OF EVACUEE

| CROWD | ROUTE |
|---|---|
| POPULATION OF A DISTRICT | A→(L1)→B→(L3)→C→(L5)→D |

Fig.3

(A) EXAMPLE OF ROUTE

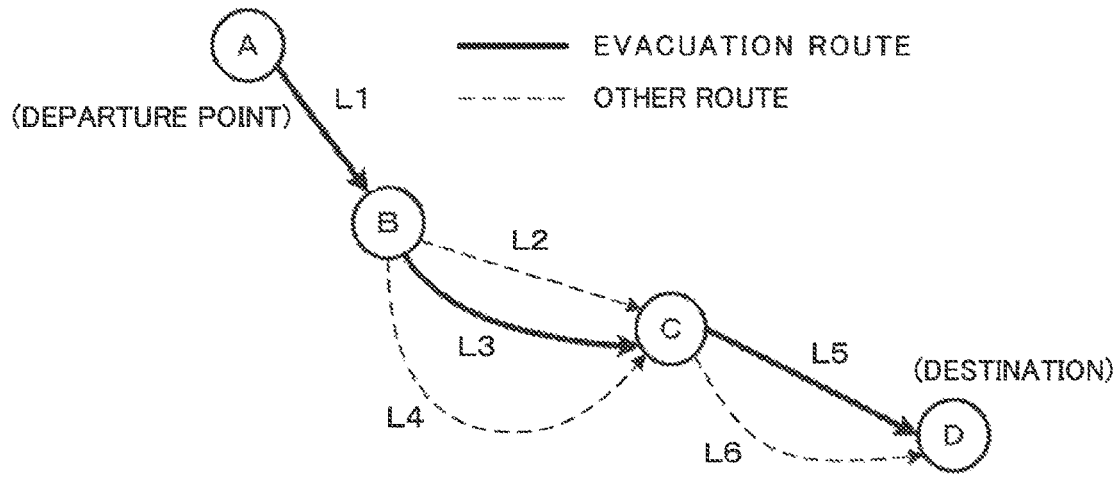

(B) SCORE FOR EACH LINK

| LINK | EVALUATION EXPRESSION | SCORE |
|---|---|---|
| L1 | 1/{10(DISTANCE OF L1)+10(DISTANCE OF L3)+10(DISTANCE OF L5)} | 1/30 |
| L2 | 1/{10(DISTANCE OF L2)+10(DISTANCE OF L3)} | 1/20 |
| L3 | 1/{30(DISTANCE OF L3)+10(DISTANCE OF L3)} | 1/40 |
| L4 | 1/{90(DISTANCE OF L4)+10(DISTANCE OF L3)} | 1/100 |
| L5 | 1/10(DISTANCE OF L5) | 1/10 |
| L6 | 1/20(DISTANCE OF L6) | 1/20 |

(C) DEVIATION RISK AND PRIORITY ORDER OF GUIDE SIGN ARRANGEMENT AT EACH FORK

| POINT | EVALUATION EXPRESSION | DEVIATION RISK | PRIORITY ORDER |
|---|---|---|---|
| A | n/a (ONE LINK WHOSE START POINT IS A) | 0 | THIRD PLACE |
| B | (1/20+1/100)/(1/40) | 2.4 | FIRST PLACE |
| C | (1/20)/(1/10) | 0.5 | SECOND PLACE |

Fig.4

(A) EXAMPLE OF ROUTE AND TIME REQUIRED TO TRAVEL EACH LINK

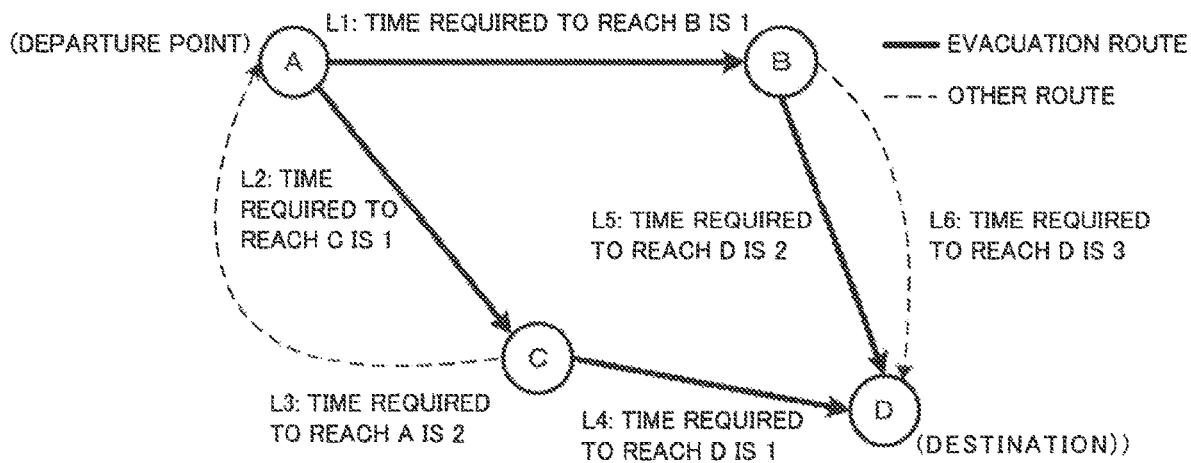

(B) SCORE FOR EACH LINK

| POINT | EVALUATION EXPRESSION | DEVIATION RISK |
|---|---|---|
| A | NOT APPLICABLE (ALL FORKS INCLUDED IN EVACUATION ROUTE) | n/a |
| B | 3(TIME REQUIRED FOR L6) − 2(TIME REQUIRED FOR L5) | 1 |
| C | {2(TIME REQUIRED FOR L3) + 1(TIME REQUIRED FOR L5) +1(TIME REQUIRED FOR L4)} −1(TIME REQUIRED FOR L4) | 3 |
| D | NOT APPLICABLE (IT IS DESTINATION) | n/a |

(C) PRIORITY ORDER OF SIGN ARRANGEMENT AT EACH POINT

| POINT | DEVIATION RISK | PRIORITY ORDER |
|---|---|---|
| B | 1 | SECOND PLACE |
| C | 3 | FIRST PLACE |

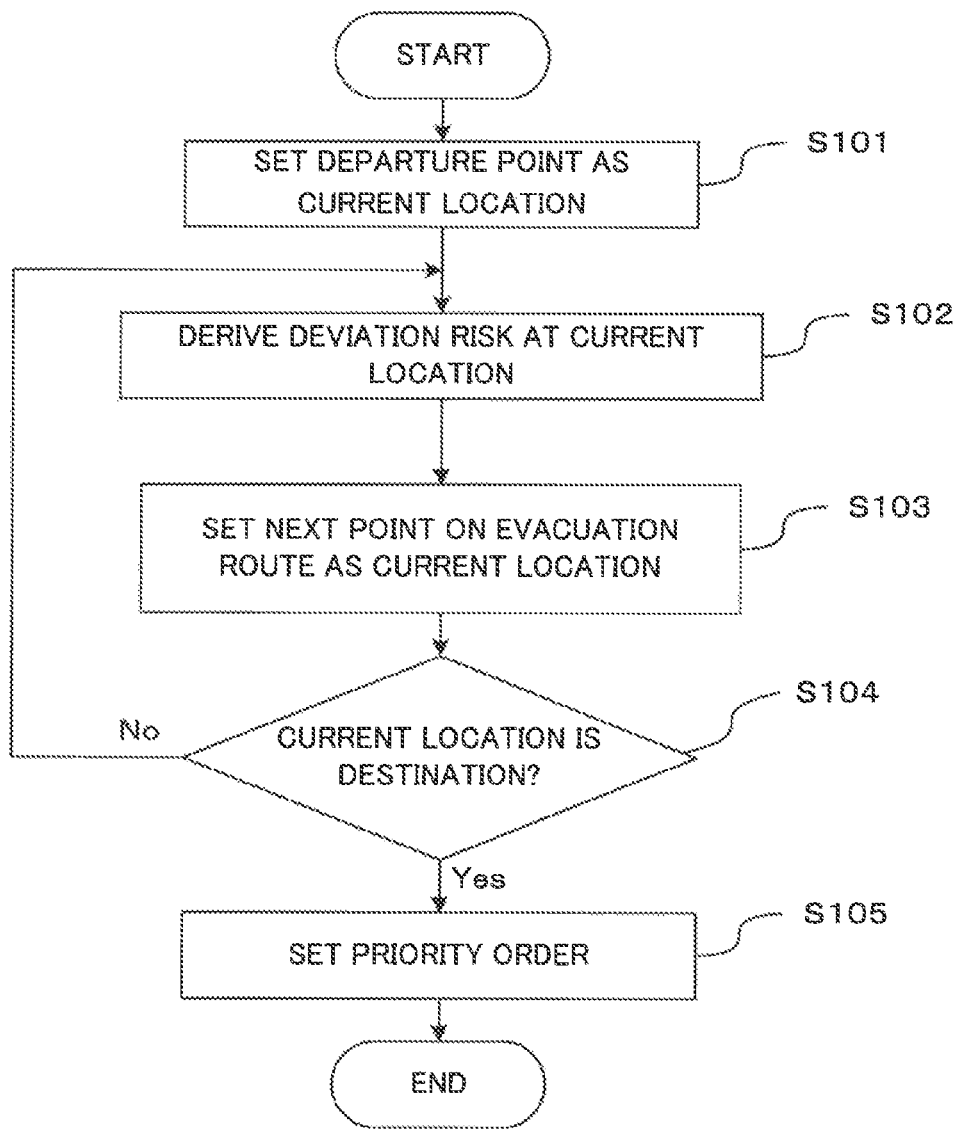

Fig.8

(1) RESTRICTION ON NECESSARY NUMBER OF GUIDE SIGNS

| REGION | NECESSARY NUMBER OF SIGN ARRANGEMENT |
|---|---|
| A DISTRICT | 2 |

(2) PRIORITY ORDER CONCERNED WITH ARRANGEMENT OF GUIDE SIGN AT EACH POINT

| POINT | EVALUATION EXPRESSION | DEVIATION RISK | PRIORITY ORDER |
|---|---|---|---|
| A | n/a (DUE TO UNFORKED ROAD) | 0 | THIRD PLACE |
| B | (1/20+1/100)/(1/40) | 2.4 | FIRST PLACE |
| C | (1/20)/(1/10) | 0.5 | SECOND PLACE |

} TOP TWO (3) PRESENCE OR ABSENCE OF ARRANGEMENT OF GUIDE SIGN AT EACH POINT

| POINT | PRESENCE OR ABSENCE OF ARRANGEMENT |
|---|---|
| A | ABSENT |
| B | PRESENT |
| C | PRESENT |

GUIDANCE ASSISTANCE SYSTEM, GUIDANCE ASSISTANCE METHOD, AND COMPUTER-READABLE RECORDING MEDIUM

The present application is a Continuation application of Ser. No. 15/564,467 filed on Oct. 5, 2017, which is a National Stage Entry of PCT/JP2016/062187 filed on Apr. 11, 2016, which claims priority from Japanese Patent Application 2015-081701 filed on Apr. 13, 2015, the contents of all of which are incorporated herein by reference, in their entirety.

TECHNICAL FIELD

The present invention relates to a guidance assistance system, a guidance assistance method, and a computer-readable recording medium.

BACKGROUND ART

In case of a disaster, a victim having suffered the disaster may need to be evacuated from a region where the disaster has occurred. When a victim who needs to be evacuated (hereinafter referred to as an "evacuee") is evacuated, it is desired that he/she is evacuated via an evacuation route selected in terms of evacuation time, safety, and the like.

On the other hand, when being evacuated, the evacuee may deviate from the evacuation route described above. For example, the evacuee may be guided with an electronic signboard that indicates an evacuation direction, a guide light, or the like, in order to prevent the evacuee from deviating from the evacuation route. In this case, the evacuee is preferably guided based on possibility that the evacuee deviates from the evacuation route described above, a severity of problems that may possibly occur when the evacuee deviates from the evacuation route, or the like.

Not only at occurrence of a disaster but also in a normal condition, when a large-scale event or the like is held, for example, a crowd that participates in the event may need to be guided. Also in this case, the crowd is preferably guided based on possibility that the crowd deviates from a predetermined travel route, a severity of problems that may possibly occur when the crowd deviates from the travel route, or the like, similarly to the guidance of the evacuee described above.

In PTL 1, a technology of an evacuation guidance system is described. In the evacuation guidance system described in PTL 1, when receiving an alarm signal, a drive control means provided in a security light specifies an evacuation site corresponding to a type of the alarm signal and operates a direction display means such that the direction display means indicates a direction of the evacuation site.

In PTL 2, an evacuation guidance system for reducing anxiety of an evacuee concerned with an evacuation by clarifying a route to an evacuation place to the evacuee is described.

CITATION LIST

Patent Literature

[PTL 1] Japanese Patent Application Laid-Open No. 2013-164695
[PTL 2] Japanese Patent Application Laid-Open No. 2005-234768

SUMMARY OF INVENTION

Technical Problem

In the technology described in PTL 1 or PTL 2, it is assumed that a security light and a guide sign used for guiding an evacuee are arranged on an evacuation route in advance. In these technologies, however, appropriateness of places where the security light and the guide sign are arranged is not necessarily taken into consideration. In other words, in the technology described in PTL 1 or PTL 2, a crowd including evacuees may not be appropriately guided.

The present invention has been made to solve the above-mentioned problems, and a primary object thereof is to provide a guidance assistance system and the like for reducing an influence on a case in which a crowd deviates from a travel route.

Solution to Problem

A guidance assistance system according to one aspect of the present invention includes: deviation risk evaluation means for deriving a deviation risk representing an influence on a deviation of a crowd from a travel route at a predetermined point on the travel route based on information relating to circumstances of the travel route and a route related to the travel route, and priority order determining means for determining an order of priority relating to arrangement of a guide sign that guides the crowd based on the deviation risk.

A guidance assistance method according to one aspect of the present invention includes: deriving a deviation risk representing an influence on a deviation of a crowd from a travel route at a predetermined point on the travel route based on information relating to circumstances of the travel route and a route related to the travel route, and determining an order of priority relating to arrangement of a guide sign that guides the crowd based on the deviation risk.

A computer-readable recording medium according to one aspect of the present invention non-transitorily stores a program for causing computer to execute a process of deriving a deviation risk representing an influence on a deviation of a crowd from a travel route at a predetermined point on the travel route based on information relating to circumstances of the travel route and a route related to the travel route, and a process of determining an order of priority relating to arrangement of a guide sign that guides the crowd based on the deviation risk.

Advantageous Effects of Invention

The present invention can provide a guidance assistance system and the like for reducing an influence on a case in which a crowd deviates from a travel route.

BRIEF DESCRIPTION OF DRAWINGS

FIG. 3 is a diagram illustrating an example of a procedure when an order of priority relating to arrangement of guide signs is determined in the guidance assistance system in the first example embodiment of the present invention.

FIG. 4 is a diagram illustrating an example of another procedure when the order of priority relating to the arrangement of the guide signs is determined in the guidance assistance system in the first example embodiment of the present invention.

FIG. 5 is a flowchart illustrating an operation of the guidance assistance system in the first example embodiment of the present invention.

FIG. 8 is a diagram illustrating an example of an operation of an arrangement selecting unit in the guidance assistance system in the second example embodiment of the present invention.

DESCRIPTION OF EMBODIMENTS

Figure 11:
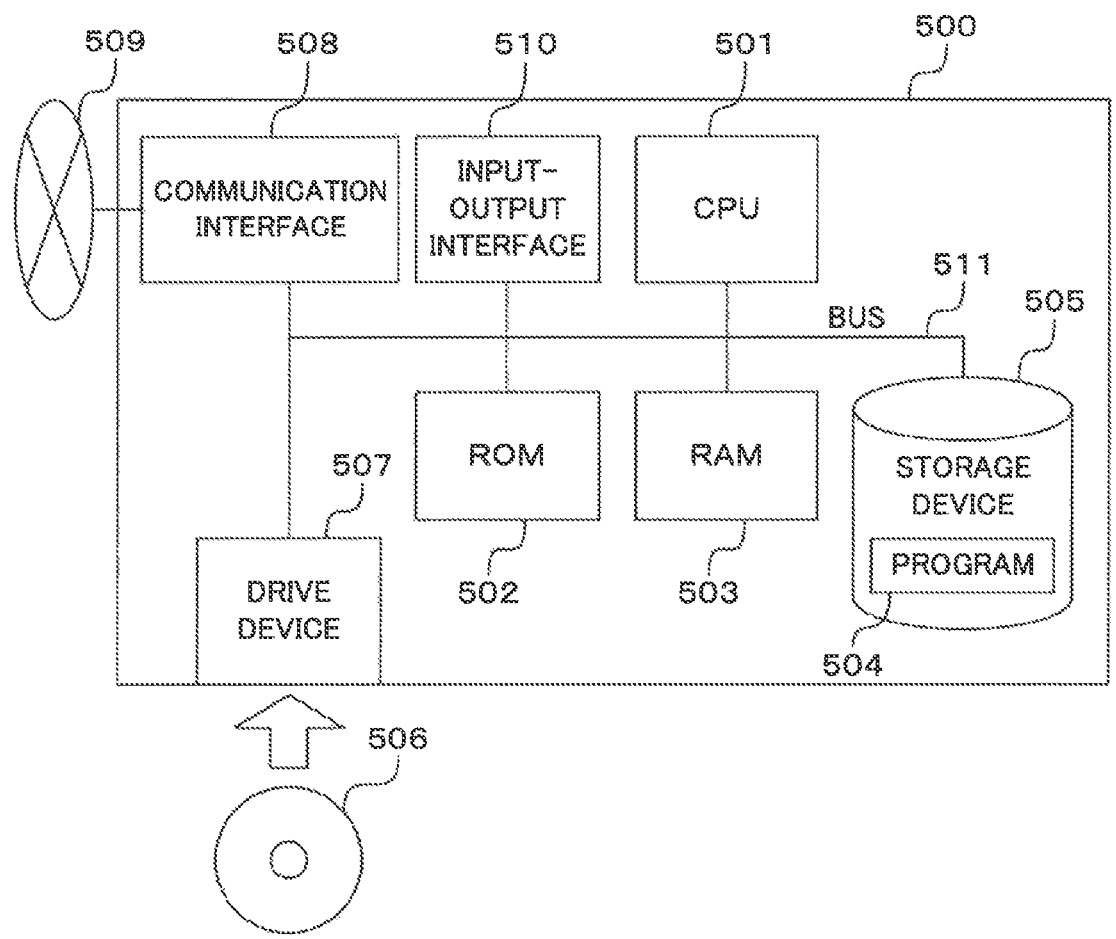
FIG. 11 is a diagram illustrating an example of an information processing device that implements the guidance assistance system and other devices in each of the example embodiments of the present invention.

Each example embodiment of the present invention will be described with reference to the accompanying drawings. In each example embodiment of the present invention, each of structural components of each device illustrates a block of functional units. Each components of each device can be implemented by a suitable-selected combination of an information processing device 500 as illustrated in, for example, FIG. 11 and software. The information processing device 500 includes configurations as follows as an example.

A CPU (Central Processing Unit) 501
A ROM (Read Only Memory) 502
A RAM (Random Access Memory) 503
A program 504 loaded into the RAM 503
A storage device 505 that stores the program 504
A drive device 507 that reads and writes a recording medium 506
A communication interface 508 connected with a communication network 509
An input-output interface 510 that inputs and outputs data
A bus 511 that connects structural components To implement components of each device in each example embodiment, the CPU 501 acquires and executes the program 504, which implements functions of the components. The program 504, which implements the functions of the components of each device, is previously stored in the storage device 505 or the RAM 503, for example. The CPU 501 reads the program 504 as necessary. Note that the program 504 may be supplied to the CPU 501 via the communication network 509, or may be stored in the recording medium 506 in advance and read by the drive device 507 to be supplied to the CPU 501.

A method for implementing each device has various modification examples. For example, each device may be implemented by a suitably-selected combination of each separate information processing device 500 and the program for each component. Alternatively, a plurality of components provided in each device may be implemented by a suitably-selected combination of one information processing device 500 and the program.

A part or the whole of each component of each device may be implemented by general-purpose or special circuitry including a processor and the like, or implemented by a combination thereof. The circuitry may be formed by a single chip or formed by a plurality of chips connected to one another via a bus. A part or the whole of each component of each device may also be implemented by a combination of the circuitry described above or the like and the program.

When a part or the whole of each component of each device is implemented by a plurality of information processing devices, circuits, or the like, the plurality of information processing devices, circuits, or the like may be arranged in a concentrated manner or a distributed manner. For example, the information processing devices, the circuits, or the like may be implemented by a manner in which a client server system, a cloud computing system, or the like is each connected via a communication network. In each example embodiment of the present invention, a configuration or an operation of each system or the like will be described by taking, as an example, a case where an evacuee is evacuated from an evacuation origin to an evacuation destination via an evacuation route. However, each system or the like in each example embodiment of the present invention is applicable to a case where a crowd of any number of people travels from a departure point to a destination via a predetermined travel route. In other words, in the following example, the crowd is guided so as to travel from the departure point to the destination via the travel route. Evacuees are an example of the crowd of any number of people. An evacuation route is an example of the travel route.

In the example where the evacuees are evacuated via the evacuation route, it is assumed that the evacuation route as well as a point to be the evacuation destination are predetermined by, for example, a municipality or the like related to the evacuation route depending on a place where a disaster has occurred, a type of the disaster, or other constraint. As an example, the evacuation route is a route determined by the municipality or the like with consideration given to, for example, a hazard map of a region related to the evacuation route. In this case, when the region related to the evacuation route is located along mountains, a route where a landslide is expected to be less likely to occur, for example, is determined as the evacuation route. When the region related to the evacuation route is located along a coast, a route at an altitude equal to or higher than a certain height where little flood damage caused by a tsunami is expected is the evacuation route. Further, the evacuation route may be the shortest route that is mathematically obtained by using an existing algorithm such as the Dijkstra method. The evacuation route may also be a route with less obstacles where mobility-impaired evacuees can pass.

Note that the evacuation route, the evacuation origin and the evacuation destination may be changed at any time depending on a disaster or a recover condition from the disaster. Further, in each example embodiment of the present invention, the evacuation route may be a route different from the shortest route that connects a departure point as the evacuation origin and a destination as the evacuation destination.

Similarly to the evacuation route described above, it is assumed that a travel route used for traveling of the crowd in general is assumed based on various conditions in advance. The travel route may be a route different from the shortest route that connects the departure point and the destination.

In each example embodiment of the present invention, the guide sign is freely-selected means for transmitting the evacuation route to the evacuees. For example, the guide sign is an electronic signboard called a digital signage that can indicate a direction, a guide plate, a guide light, or other means. Alternatively, the guide sign may also be a guide or the like who guides the evacuees at any point on the evacuation route. Moreover, the guide sign may also be an application that is executed by a mobile electronic device such as a smartphone held by an evacuee and displays the evacuation route to guide the evacuee who carries the mobile electronic device.

First Example Embodiment

Figure 1:
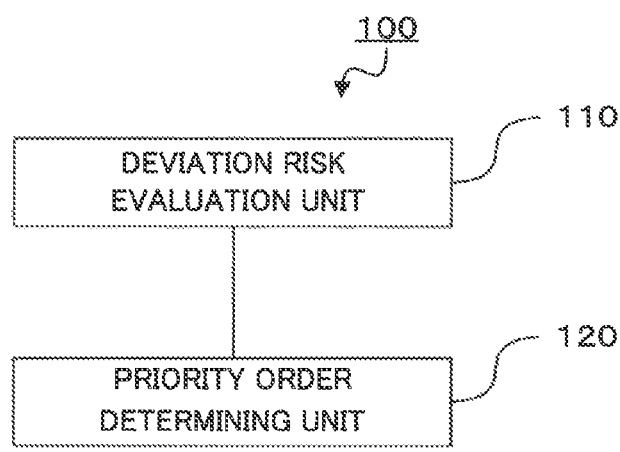
FIG. 1 is a diagram illustrating a configuration of a guidance assistance system in a first example embodiment of the present invention.
Figure 2:
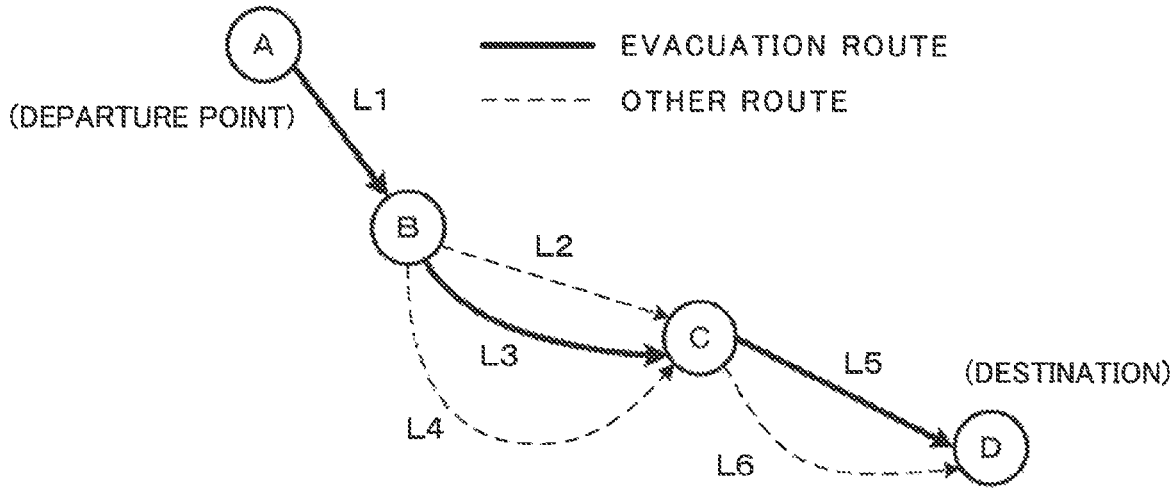
FIG. 2 is a diagram illustrating an example of an evacuation route to be targeted in the guidance assistance system or other information in the first example embodiment of the present invention.
Figure 6:
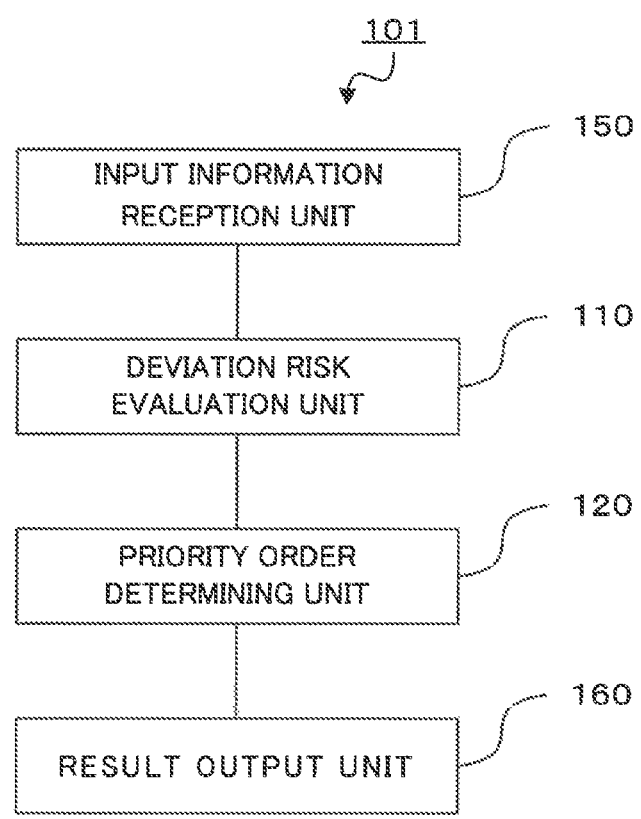
FIG. 6 is a diagram illustrating a configuration of a modification example of the guidance assistance system in the first example embodiment of the present invention.

First, a first example embodiment of the present invention is described. FIG. 1 is a diagram illustrating guidance assistance in the first example embodiment of the present invention. FIG. 2 is a diagram illustrating an example where an evacuation route or the like is targeted in the guidance assistance system in the first example embodiment of the present invention. FIG. 3 is a diagram illustrating an example of a procedure when an order of priority relating to arrangement of guide signs is determined in the guidance assistance system in the first example embodiment of the present invention. FIG. 4 is a diagram illustrating an example of another procedure when the order of priority relating to the arrangement of the guide signs is determined in the guidance assistance system in the first example embodiment of the present invention. FIG. 5 is a flowchart illustrating an operation of the guidance assistance system in the first example embodiment of the present invention. FIG. 6 is a diagram illustrating a configuration of a modification example of the guidance assistance system in the first example embodiment of the present invention.

As illustrated in FIG. 1, a guidance assistance system 100 in the first example embodiment of the present invention includes a deviation risk evaluation unit 110, and a priority order determining unit 120. The deviation risk evaluation unit 110 derives a deviation risk based on information regarding circumstances of a travel route including an evacuation route or the like and a route related to the travel route, the deviation risk indicating an influence on a deviation of a crowd including evacuees from the travel route at a predetermined point on the travel route. The priority order determining unit 120 determines an order of priority relating to arrangement of guide signs that guide the crowd including evacuees based on the deviation risk described above.

In case of disaster, evacuees are evacuated via a predetermined evacuation route. When being evacuated, the evacuees may deviate from the predetermined evacuation route depending on circumstances of the evacuation route. For example, when many forks are located on the evacuation route or when a passage serving as the evacuation route is narrow and makes it hard to see ahead, it is conceivable that the evacuees are more likely to deviate from the evacuation route.

In addition, when traveling via the predetermined travel route in general, the crowd may deviate from the predetermined travel route depending on circumstances of the travel route.

Thus, the deviation risk evaluation unit 110 derives the deviation risk. As described above, the deviation risk represents the influence on the deviation of the evacuees from the evacuation route at a predetermined point on the evacuation route. The influence on the deviation of the evacuees from the evacuation route includes, for example, a possibility that the evacuees deviate from the evacuation route and at least one of the number of evacuees who deviate from the evacuation route and a severity of problems that may possibly occur when the evacuees deviate from the evacuation route. Examples of the problems that may possibly occur when the evacuees deviate from the evacuation route include an increase in time required to reach an evacuation destination, impossibility of reaching the evacuation destination, a need to pass a place that is more difficult to pass than the predetermined evacuation route, or other problems. The deviation risk evaluation unit 110 derives, as the deviation risk, the degree of the influence on the deviation of the evacuees from the evacuation route at a predetermined point on the evacuation route.

In addition, when an example where the crowd travels via the travel route in general is provided as a target, the deviation risk evaluation unit 110 derives the deviation risk in a similar manner to the example of the evacuees described above.

When the deviation risk evaluation unit 110 derives the deviation risk, objects to which the deviation risk is derived, such as the evacuees or the evacuation routes, are represented in a form of FIGS. 2(A) to 2(E), for example, as an initial condition. The initial condition includes information with respect to a route that connects a departure point as the evacuation origin and a destination as the evacuation destination, information with respect to a crowd of the evacuees and their evacuation route, or the like.

The information with respect to the departure point, the destination, and the route that connects them is represented in FIG. 2(A) or in a graph form as in FIG. 2(B), for example.

FIG. 2(A) is a diagram illustrating an example of a route. The route includes, for example, the departure point or the destination, and is represented with freely-selected points related to the evacuation route and a link that connects between the points. The points related to the evacuation route each include a fork where the link branches off or the links come together in addition to the departure point and the destination.

In the example illustrated in FIG. 2(A), the freely-selected points include "A" as the departure point being the evacuation origin, "D" as the destination being the evacuation destination, and "B" and "C" that are located between the departure point and the destination and serve as the forks where the link branches off and the links join together. In addition, there are six links labeled L1 to L6. In the example illustrated in FIG. 2(A) and the following examples, a route serving as the evacuation route described below is represented by a thick line and other routes are represented by a dotted line.

FIG. 2(B) illustrates details of connection relations concerned with the routes illustrated in FIG. 2(A). In other words, FIG. 2(B) includes information with respect to points as a start point and an end point, and information with respect to a distance of a link from the start point to the end point for each of the links L1 to L6 included in FIG. 2(A). Note that, in each example embodiment of the present invention, the crowd of the evacuees travels the link in a direction from the start point to the end point. In addition, the information with respect to the link may include information which is different from the above-described information, such as a width of a road related to the link, a capacity of a passable road.

Information with respect to the crowd of the evacuees and their evacuation route is represented in forms as in FIGS. 2(C) to 2(E).

FIG. 2(C) illustrates the information with respect to the crowd of the evacuees and the information with respect to the departure point as the evacuation origin and the destination as the evacuation destination. In addition, "A" or "D" in each category of FIG. 2(C) corresponds to the point on the route illustrated in FIG. 2(A) or the like. FIG. 2(D) illustrates the number of the crowd of the evacuees for each crowd, for example. FIG. 2(E) illustrates the evacuation route of the crowd of the evacuees for each crowd, for example. In FIG. 2(E), information with respect to the links and points through which the crowd of the evacuees passes is included. In other words, in the example illustrated in FIG. 2(E), the evacuee reaches the point D as the destination from the point A as the departure point via the link L1, the point B, the link L3, the point C, and the link L5.

In addition, the deviation risk evaluation unit 110 acquires the initial condition described above via any input means, a communication network, or the like, for example. The deviation risk evaluation unit 110 may appropriately acquire the initial condition previously stored in a memory, a disk device, or the like.

The deviation risk evaluation unit 110 derives the deviation risk by using the initial condition described above or the like. As an example, the deviation risk evaluation unit 110 derives the deviation risk based on the distance from each of the points to the destination on the evacuation route.

The evacuees tend to select, as the evacuation route, the route having the shortest distance from the departure point, which is the evacuation origin, to the destination, which is the evacuation destination. On the other hand, in case of disaster, the route having the shortest distance from the departure point to the destination may be difficult to pass therethrough due to obstacles or other problems. Further, the route having the shortest distance from the departure point to the destination may not be the shortest route in time because the route has a narrow width and allows few people to pass therethrough at once, there are hills on the route, or other reasons. In other words, the route determined as the evacuation route may be different from the route having the shortest distance from the departure point to the destination.

Assuming a travel route other than the evacuation route, the travel route may be different from the route having the shortest distance from the departure point to the destination.

Accordingly, in this example, the deviation risk evaluation unit 110 derives the deviation risk such that the deviation risk evaluation unit 110 rates a case where there is a route shorter than the evacuation route as a high deviation risk (a high possibility that the evacuees deviate from the evacuation route). In this example, a level of the deviation risk is indicated by a magnitude of a value derived as the deviation risk. FIG. 3 is a diagram illustrating an example of a case where the deviation risk evaluation unit 110 rates the deviation risk of the route illustrated in FIG. 2.

In the example illustrated in FIG. 3, the deviation risk evaluation unit 110 derives a score for each link on the route as illustrated in FIG. 2(A) or 2(B), for example.

The score is a reciprocal of a distance of the shortest route from a point being the start point of the link to a point being the destination, for example. In other words, the deviation risk evaluation unit 110 derives a score for each of the links in the example of the route illustrated in FIG. 3(A), which is the same route of FIG. 2, by using an evaluation expression illustrated in FIG. 3(B).

In the example illustrated in FIG. 3, with regard to the link L1, for example, the deviation risk derivation unit 110 obtains the shortest route from the point "A" as the start point of the link to the point "D" as the destination.

The shortest route from the point "A" to the point "D" via the link L1 is a route via the links L1, L2, and L5, by using the distance illustrated in FIG. 2(B). Since all the distance determined between the links is 10, thus the distance of the route from the point "A" to the point "D" is 30. Thus, the deviation risk derivation unit 110 derives 1/30 as the score for the link L1 by using the reciprocal of the distance. Note that "/" is a symbol that represents division.

In the example illustrated in FIG. 3, the deviation risk derivation unit 110 similarly obtains scores for the other links.

Then, the deviation risk evaluation unit 110 derives the deviation risk from the score derived in the manner described above. In this example, the deviation risk is a value that, at each point of the departure point or the forks, the score for the route different from the evacuation route from the point to the destination is divided by the score for the evacuation route from the point to the destination. At each point, when there is one link whose start point is the point, there is conceivably no possibility (or exceedingly low possibility) that the evacuees deviate from the evacuation route at the relevant point. Therefore, the deviation risk evaluation unit 110 derives the deviation risk in this case as zero, for example.

In particular, the deviation risk evaluation unit 110 derives the deviation risk at each point of the departure point and the forks with respect to that illustrated in FIG. 3(A) by using the evaluation expression illustrated in FIG. 3(C) based on the score illustrated in FIG. 3(B). In the example illustrated in FIG. 3, the deviation risk evaluation unit 110 derives the deviation risk at the point "B" as 2.4 and the deviation risk at the point "C" as 0.5. In addition, there is one link whose start point is the point "A", so that the evaluation expression is not used to obtain the deviation risk at the point "A". Then, the deviation risk at the point "A" is derived as zero.

Note that, at each point, when there is a link in a connection relationship in which the destination cannot be reached from the point, the distance of the link is represented by a value representing that the link is in the connection relationship in which the destination cannot be reached, for example. As an example, the distance of the link is treated as infinity.

The deviation risk evaluation unit 110 derives the deviation risk so as to represent a large influence on the deviation when a value of the derived deviation risk is large, as described above, for example.

As another example, the deviation risk evaluation unit 110 assesses the deviation risk based on time required for travelling from each point on the evacuation route to the destination.

In event of disaster, a plurality of evacuation routes may be determined depending on circumstances of roads serving as possible evacuation routes, the number of evacuees, or other factors. In other words, the initial condition described above may include a plurality of the evacuation routes. In this case, a level of the deviation risk needs to be compared between the plurality of the evacuation routes. In the comparison of the deviation risk, there may be a case where the influence of the deviation from the evacuation route needs to be considered, in addition to the possibility that the evacuees simply deviate from the evacuation route.

Thus, in this example, the deviation risk evaluation unit 110 derives the deviation risk such that the deviation risk is rated high when the deviation of the evacuees from the evacuation route leads to a great loss of time (the influence of the deviation of the evacuees from the evacuation route is great). FIG. 4 is a diagram illustrating an example of evaluation of the deviation risk by the deviation risk evaluation unit 110 when the plurality of evacuation routes are determined as the initial condition.

In the example illustrated in FIG. 4, the route has the connection relation represented in a graph in FIG. 4(A). In other words, the departure point is a point "A", and the destination is a point "D". In addition, there are links L1 to L6 as illustrated in FIG. 4(A). Information with respect to a direction in which the evacuees travel a link at the time of the evacuation, and information with respect to time required for travelling the link are set for each of the links. Further, in the example illustrated in FIG. 4(A), two evacuation routes are set. One of the evacuation routes is a route that reaches the point "D", which is the destination, from the point "A" via the link L1, a point "B", and the link L5. Another evacuation route is a route that reaches the point "D", which is the destination, from the point "A" via the link L1, the point "B", and the link L5.

The deviation risk evaluation unit 110 derives the deviation risk for each point of departure point or forks with respect to the example illustrated in FIG. 4 based on time required for the evacuees to travel each link.

Specifically, the deviation risk evaluation unit 110 determines, as the deviation risk, a difference between the time required to reach the destination when the evacuee deviate from the deviation route at each point and the time required to reach the destination when the evacuee travel along the evacuation route from each point. At a point such as the departure point or the fork, when all routes to the other points are determined as the evacuation routes, there is conceivably no possibility (or exceedingly low possibility) that the evacuees deviate from the evacuation route at the point in the first place. Accordingly, the deviation risk evaluation unit 110 derives the deviation risk so as to represent that there is no deviation risk at the point.

In the example illustrated in FIG. 4, all the links from the point A to the other points are determined as the evacuation routes. Thus, there is conceivably no possibility (or exceedingly low possibility) that the evacuees deviate from the evacuation route at the point in the first place. Therefore, the deviation risk evaluation unit 110 derives the deviation risk at the point "A" as "n/a" so as to represent that there is no deviation risk at the point "A". In other words, in this example embodiment, "n/a" represents that there is no deviation risk at the point. Similarly, the deviation risk evaluation unit 110 derives the deviation risk at the point "D", which is the destination, as "n/a". The deviation risk evaluation unit 110 derives the deviation risk at each of the point "B" and a point "C" by using an evaluation expression illustrated in FIG. 4(B).

With regard to the point "B", the deviation risk evaluation unit 110 obtains time required to deviate from the evacuation route and reach the point "D", which is the destination, via the link L6, and obtains time required to reach the point "D" via the link L5 which is along the evacuation route. Then, the deviation risk evaluation unit 110 derives, as the deviation risk at the point "B", 1 that is a difference between the time required to deviate from the evacuation route and reach the point "D" which is the destination and the time required to reach the point "D" along the evacuation route.

Similarly, with regard to the point "C", the deviation risk evaluation unit 110 obtains time required to deviate from the evacuation route and reach the point "D" which is the destination, via the links L3, L2, and L4. In addition, the deviation risk evaluation unit 110 obtains time required to reach the point "D" via the link L4, which is along the evacuation route. The deviation risk evaluation unit 110 then derives, as the deviation risk at the point "C", 3 that is a difference between the time required to deviate from the evacuation route and reach the point "D" which is the destination, and the time required to reach the point "D" along the evacuation route.

As illustrated in FIG. 2 or FIG. 3, even when only one evacuation route is determined, the deviation risk evaluation unit 110 may derive the deviation risk based on time required to pass routes including the evacuation route. In addition, as illustrated in FIG. 4, even when the plurality of evacuation routes are determined, the deviation risk evaluation unit 110 may derive the deviation risk based on a distance of each route including the evacuation route.

Further, the deviation risk evaluation unit 110 may derive the deviation risk by a method different from the above-described method. For example, by using a method different from the above-described method, the deviation risk evaluation unit 110 may derive the deviation risk so as to provide a high deviation risk to a point such as a fork where it is expected that the evacuees are more likely to deviate from the evacuation route.

For example, possibility that the evacuees deviate from the evacuation route is determined based on a width or traffic volume of each road related to the link connected to the fork, brightness of the road, cleanness of the road, or other factors. The possibility that evacuees deviate from the evacuation route may be determined based on confusion between the evacuation route and a route different from the evacuation route, a distance to the destination, and the number of links (roads) connected to a fork.

The deviation risk evaluation unit 110 may derive the deviation risk at a point different from the point such as the departure point or the fork described above. Further, the deviation risk evaluation unit 110 may derive the deviation risk such that a high deviation risk is assigned to a point having a large severity of problems that may possibly occur when the evacuees deviate from the evacuation route.

The severity of the problems that may possibly occur when the evacuees deviate from the evacuation route is determined based on a change in a distance to the destination, time until the arrival at the destination, or the like as an example. In other words, the severity of the problems described above is great when the deviation of the evacuees from the evacuation route causes an extreme increase in the distance to the destination or a significant increase in the time until the arrival at the destination. The severity of the problems may be determined based on a possibility that the deviation of the evacuees from the evacuation route causes the impossibility of reaching the destination or the impossibility of returning to the predetermined evacuation route, or other possibilities.

The deviation risk evaluation unit 110 may derive the deviation risk so as to increase the possibility that guide signs are arranged at points where many evacuees are expected to visually recognize the guide signs. Furthermore, the deviation risk evaluation unit 110 may derive the deviation risk by using the methods described above in combination.

The priority order determining unit 120 determines an order of priority relating to arrangement of guide signs based on the deviation risk derived by the deviation risk evaluation unit 110. In other words, the priority order determining unit 120 orders places where the guide signs are to be arranged based on the deviation risk derived by the deviation risk evaluation unit 110 in any form. For example, the priority order determining unit 120 determines ranking of respective points on the evacuation route, to which the deviation risk has been derived, in such a way that the point with the higher deviation risk is ranked higher based on the value derived as the deviation risk, and thus determines the order of priority. When a travel route other than the evacuation route is targeted, the priority order determining unit 120 determines the order of priority relating to the arrangement of the guide signs on the travel route, to which the deviation risk has been derived, based on the value derived as the deviation risk.

In the example illustrated in FIG. 3, the deviation risk as illustrated in FIG. 3(C) described above is obtained for three points "A" to "C", which are the departure point or the fork. The priority order determining unit 120 determines an order of the three points "A" to "C" according to a magnitude of the value obtained as the deviation risk. In particular, the priority order determining unit 120 determines the point "B" having the greatest value of the deviation risk, which is 2.4, as the first priority in the order of priority relating to the arrangement of the guide signs. The priority order determining unit 120 also determines the points "A" and "C" as the third priority and the first priority, respectively, in the order of priority relating to the arrangement of the guide signs according to the values of the deviation risk.

In the example illustrated in FIG. 4, the deviation risk as illustrated in FIG. 4(C) described above is obtained with respect to two points "B" and "C", which are the forks. The priority order determining unit 120 determines, for the two points "B" and "C", an order of priority relating to the arrangement of the guide signs according to the magnitude of the values obtained as the deviation risk. In other words, the priority order determining unit 120 determines, as a first priority in the order of priority, the point "C" with the largest value obtained as the deviation risk. The priority order determining unit 120 determines, as a second priority in the order of priority, the point "B" with smaller value obtained as the deviation risk in comparison with the point "C".

The priority order determining unit 120 may determine an order of priority relating to the arrangement of the guide signs by using a procedure different from the determination procedure described above. For example, the priority order determining unit 120 may determine an order of priority by ranking priority relating to the arrangement of the guide signs at each point on the evacuation route on several predetermined scales. The priority order determining unit 120 may determine an order of priority for limited points where the deviation risk satisfies predetermined conditions and the order of priority relating to the arrangement of the guide signs is conceivably high, for example.

In conjunction with determining the order of priority relating to the arrangement of the guide signs at each point, the priority order determining unit 120 may obtain information relating to a type of the guide signs, a specific position of the arrangement of the guide signs, or the like according to circumstances around each point or the determined order of priority.

The order of priority which is determined is output via an output means such as a non-illustrated display or a communication network, for example. The deviation risk at each point or the like may be output together with the order of priority. The information relating to the determined order of priority or the like may be stored in any storage means such as a memory and a disk device not illustrated.

Next, an operation of the guidance assistance system 100 in the first example embodiment of the present invention are described by using a flowchart illustrated in FIG. 5.

First, the deviation risk evaluation unit 110 derives a deviation risk at each of points, which are the departure point, the target value, and the fork on the evacuation route, for example. The deviation risk evaluation unit 110 sets a point, which is the departure point, as a current location by using the initial condition that has been acquired in advance (Step S101).

The deviation risk evaluation unit 110 then derives the deviation risk at the point set as the current location by appropriately using the initial condition that has been acquired in advance (Step S102). The deviation risk evaluation unit 110 derives the deviation risk by the procedure described above.

Subsequently, the deviation risk evaluation unit 110 sets a next point on the evacuation route as the current location (Step S103). The next point on the evacuation route is another point that can be reached from the point serving as the current location via one link.

Next, the deviation risk evaluation unit 110 determines whether the point set as the current location is the destination (Step S104). When the point set as the current location is the destination (Step S104: Yes), the deviation risk evaluation unit 110 derives the deviation risk at each of the points on the evacuation route, and proceeds to Step S105. When the current location is not the point set as the destination (Step S104: No), the deviation risk evaluation unit 110 returns to Step S102, and derives the deviation risk from the point set in Step S103.

Note that the case where the plurality of evacuation routes are determined is assumed as illustrated in FIG. 4, for example. In this case, the deviation risk evaluation unit 110 may derive the deviation risk at points included in each of the plurality of evacuation routes by repeating the process from Step S101 to Step S103 as appropriate, after the deviation risk evaluation unit 110 determines that the current location is the destination in Step S104.

Proceeding to Step S105, the priority order determining unit 120 determines an order of priority, which relating to the arrangement of the guide signs, of each point on the evacuation route. The order of priority relating to the arrangement of the guide signs which is determined is appropriately output via a non-illustrated output means or the like.

A user of the guidance assistance system 100 can appropriately arrange the guide sign on the evacuation route based on the order of priority determined as described above. For example, the user of the guidance assistance system 100 arranges the guide sign in order from the point determined to have a high priority. The user of the guidance assistance system 100 may arrange a guide sign having high visibility, arrange a plurality of guide signs, or locate many guides at the point determined to have the high priority. In addition, when the guide sign is an application that is executed by a mobile electronic device and displays the evacuation route or the like, a direction of the evacuation route with respect to the point determined to have the high priority may be emphasized on display.

As described above, the guidance assistance system 100 in the first example embodiment of the present invention determines the order of priority relating to the arrangement of the guide signs at the departure point and the forks on the travel route of the crowd such as the evacuation route, based on the deviation risk described above. The guidance assistance system 100 in this example embodiment can determine the order of priority relating to the arrangement of the guide signs at freely-selected points on the evacuation route such as a point being the fork, regardless of the arrangement of the guide signs arranged on the evacuation route in advance. Thus, by using the guidance assistance system 100 in this example embodiment, the guide sign can be arranged at a point where there is a high possibility that the evacuees as an example of the crowd deviate from the evacuation route, or a point where there is a high possibility that the serious problem occurs when the evacuees deviate from the evacuation route. Therefore, the guidance assistance system 100 in this example embodiment can reduce the influence on the deviation of the evacuees from the evacuation route.

Modification Example of First Example Embodiment

The guidance assistance system 100 in the first example embodiment of the present invention has a conceivable modification example.

As an example, a guidance assistance system 101 in the first example embodiment of the present invention may be configured to include an input information reception unit 150 and a result output unit 160 as illustrated in FIG. 6.

The input information reception unit 150 receives information needed to derive the deviation risk including the initial condition described above and to determine the order of priority relating to the arrangement of the guide signs. The input information reception unit 150 is implemented by any input means such as a keyboard and a touch panel. The result output unit 160 outputs the order of priority (such as the rank, for example) relating to the arrangement of the guide signs determined by the priority order determining unit 120. The result output unit 160 is implemented by any output means such as a display. The result output unit 160 may output the information regarding the deviation risk at each of the points on the evacuation route derived by the deviation risk evaluation unit 110.

In the first example embodiment of the present invention, the guidance assistance system 100 is described by taking the case where the evacuees are evacuated from the evacuation origin to the evacuation destination via the evacuation route, as an example. However, as described above, the guidance assistance system 100 in this example embodiment and its modification example are applicable to the case where the crowd of any number of people travels from the departure point to the destination via the predetermined travel route. In other words, the guidance assistance system 100 can determine the order of priority relating to the arrangement of the guide signs that guide the crowd, in any case where the crowd is guided along the predetermined travel route differently from the evacuation of the evacuees.

Specifically, the deviation risk evaluation unit 110 derives the deviation risk that indicates the influence on the deviation of the crowd from the travel route at the predetermined point on the travel route based on the information regarding the travel route and circumstances of a route related to the travel route. In this case, the deviation risk represents the influence on the deviation of the crowd from the travel route at the predetermined point on the travel route as described above. The influence includes, for example, the possibility that the crowd deviates from the travel route and at least one of the number of travelers included in the crowd who deviate from the travel route or the severity of problems that may possibly occur when the crowd deviates from the travel route.

Further, the priority order determining unit 120 determines the order of priority relating to the arrangement of the guide signs that guide the crowd on the travel route based on the deviation risk.

The influence on the deviation of the crowd from the travel route can be reduced by using the guidance assistance system 100 in this example embodiment, even when the crowd is guided via the predetermined travel route in general.

Second Example Embodiment

Figure 7:
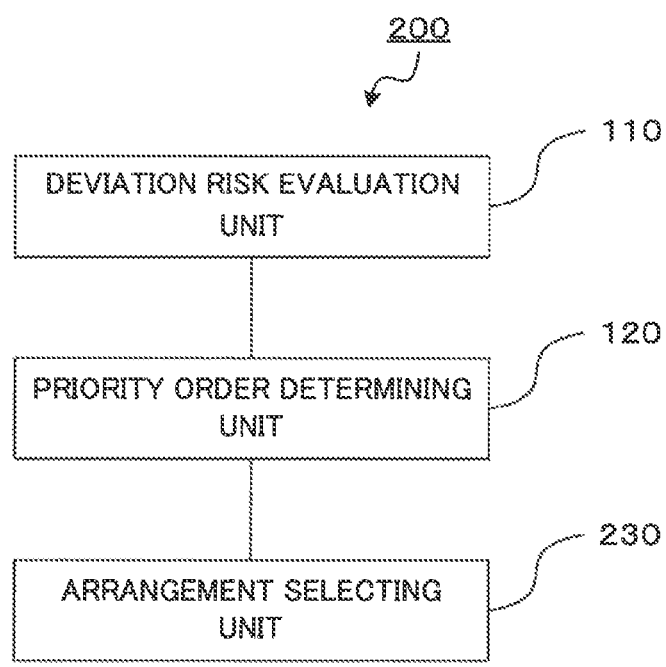
FIG. 7 is a diagram illustrating a configuration of a guidance assistance system in a second example embodiment of the present invention.
Figure 9:
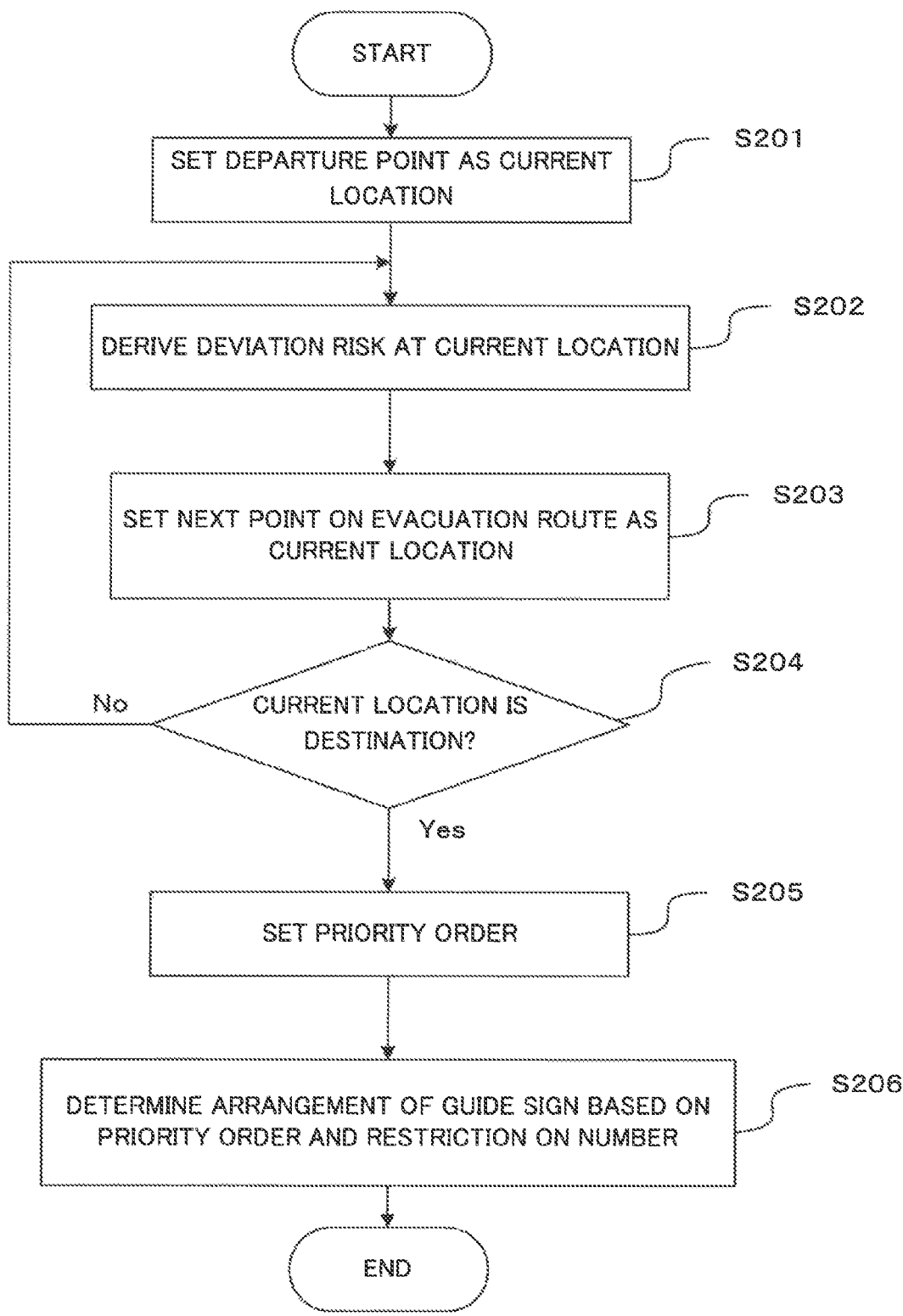
FIG. 9 is a flowchart illustrating an operation of the guidance assistance system in the second example embodiment of the present invention.
Figure 10:
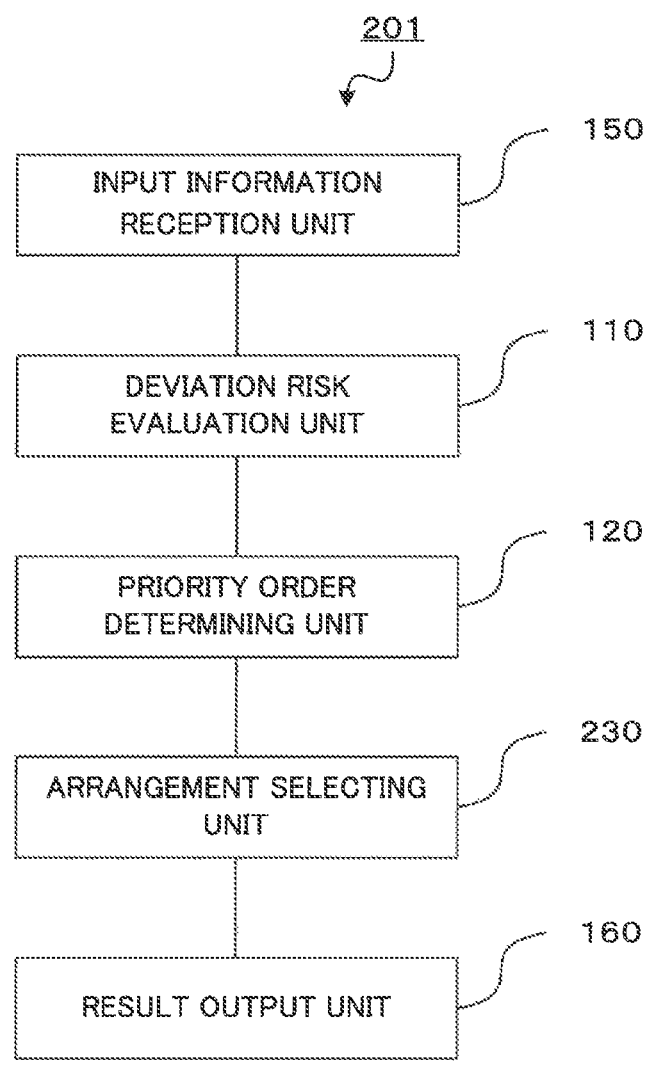
FIG. 10 is a diagram illustrating a configuration of a modification example of the guidance assistance system in the second example embodiment of the present invention.

Next, a second example embodiment of the present invention is described. FIG. 7 is a diagram illustrating a configuration of a guidance assistance system in a second example embodiment of the present invention. FIG. 8 is a diagram illustrating an example of an operation of an arrangement selecting unit in the guidance assistance system in the second example embodiment of the present invention. FIG. 9 is a flowchart illustrating an operation of the guidance assistance system in the second example embodiment of the present invention. FIG. 10 is a diagram illustrating a configuration of a modification example of the guidance system in the second example embodiment of the present invention.

As illustrated in FIG. 7, a guidance assistance system 200 in the second example embodiment of the present invention includes a deviation risk evaluation unit 110, a priority order determining unit 120, and an arrangement selecting unit 230. The arrangement selecting unit 230 determines arrangement of guide signs on an evacuation route based on an order of priority determined by the priority order determining unit 120 and a constraint on the number of guide signs arranged on the evacuation route. The guidance assistance system 200 in this example embodiment differs from the guidance assistance system 100 in the first example embodiment of the present invention in the above-mentioned points. For a configuration, an operation, or the like other than those points, the guidance assistance system 200 may have the similar configuration as that of the guidance assistance system 100 in the first example embodiment of the present invention.

The number of guide signs arranged on the evacuation route may be constrained due to constraint on costs, staff, or other factors required for the arrangement of the guide signs. The guidance assistance system 200 in this example embodiment determines the order of priority relating to the arrangement of the guide signs with one constraint with respect to a constraint regarding the number of guide signs. In this way, the guidance assistance system 200 in this example embodiment can reduce an influence on the deviation of the evacuees from the evacuation route even when the number of guide signs is restricted.

As described above, the arrangement selecting unit 230 uses a constraint on the number of guide signs arranged on the evacuation route, in addition to the order of priority, and determine the arrangement of the guide signs on the evacuation route based on them. The order of priority is determined by the priority order determining unit 120. The arrangement selecting unit 230 acquires the constraint on the number of guide signs arranged on the evacuation route via any input means or the like, which is not illustrated.

As an example, the arrangement selecting unit 230 selects the arrangement of the guide signs so as to select a point, among possible points for the arrangement of the guide signs, having a high priority of the determined number as the constraint. For example, the arrangement selecting unit 230 selects the arrangement of the guide signs in such a way that the guide signs are arranged at possible point s for the arrangement of the guide signs in order from a point having the first priority to points at ranks corresponding to the determined number as the constraint.

FIG. 8 is a diagram illustrating an example of an operation when the arrangement selecting unit 230 determines the arrangement of the guide signs on the route illustrated in FIG. 2 or FIG. 3. The points "A" to "C" in FIG. 8 respectively correspond to the points "A" to "C" on the route illustrated in FIG. 2 or FIG. 3. In this example, the arrangement selecting unit 230 determines the arrangement of the guide signs with information related to the constraint on the number of guide signs arranged on the evacuation route as illustrated in FIG. 8(1) and information related to the order of priority as illustrated in FIG. 8(2).

In the example illustrated in FIG. 8, as illustrated in FIG. 8(1), the number of guide signs is restricted to two as the constraint on the number of guide signs. As illustrated in FIG. 8(2), the order of priority is determined to the points "A" to "C" on the evacuation route based on the deviation risk. In this case, the arrangement selecting unit 230 determines the arrangement such that the guide signs are arranged at two points having a high priority. In other words, the arrangement selecting unit 230 selects the arrangement of the guide signs such that the guide signs are arranged at the points "B" and "C" respectively having the first priority or the second priority.

The arrangement selecting unit 230 may determine the arrangement of the guide signs by a method different from the above-described method. For example, the arrangement selecting unit 230 may determine the arrangement of the guide signs based on the constraint on the number of guide signs determined for each type of the guide signs. When determining the arrangement of the guide signs based on the constraint as above, the arrangement selecting unit 230 can determine the arrangement of the guide signs in such a way that the guide sign, which is more effective to guide an evacuee, is arranged at a point having a high priority, for example.

In addition, when the plurality of evacuation routes are determined, the arrangement selecting unit 230 may determine the arrangement of the guide signs in such a way that the guide signs are arranged by giving priority to a specific evacuation route among the plurality of evacuation routes.

Next, an operation of the guidance assistance system 200 in the second example embodiment of the present invention are described by using the flowchart of FIG. 9.

First, the deviation risk evaluation unit 110 sets a point, which is the departure point, on the evacuation route as a current location (Step S201). Next, the deviation risk evaluation unit 110 derives a deviation risk at the point set as the current location by appropriately using the initial condition that has been acquired in advance (Step S202). Subsequently, the deviation risk evaluation unit 110 sets a next point on the evacuation route as the current location (Step S203). Next, the deviation risk evaluation unit 110 determines whether the point set as the current location is the destination (Step S204). When the point set as the current location is not the destination (Step S204: No), the deviation risk evaluation unit 110 returns to Step S202 and repeats the process. When it is determined that the point set as the current location is the destination (Step S204: Yes), the arrangement selecting unit 120 determines an order of priority relating to arrangement of guide signs based on the deviation risk (Step S205).

The guidance assistance system 200 operates in each of Step S201 to Step S205 similarly to the operation of the guidance assistance system 100 in the first example embodiment of the present invention in Step S101 to Step S105.

Subsequently, the arrangement selecting unit 230 of the guidance assistance system 200 determines the arrangement of the guide signs on the evacuation route, based on the order of priority and a constraint on the number of guide signs arranged on the evacuation route (Step S206). In other words, the arrangement selecting unit 230 selects points at which the necessary number of guide signs are arranged based on the order of priority obtained in Step S205 or the like, the constraint on the number of guide signs that has been obtained, or other constraint.

As described above, the guidance assistance system 200 in the second example embodiment of the present invention further includes the arrangement selecting unit 230. The arrangement selecting unit 230 determines the arrangement of the guide signs on the evacuation route based on the order of priority relating to the arrangement of the guide signs and the constraint on the number of guide signs. Thus, when the number of guide signs is restricted, using the guidance assistance system 200 in this example embodiment allows the guide signs to be properly arranged at points having a high priority, or the like.

Therefore, the guidance assistance system 200 in this example embodiment can reduce the influence on the deviation of the evacuees from the evacuation route even when the number of guide signs is restricted.

Modification Example of Second Example Embodiment

The guidance assistance system 200 in the second example embodiment of the present invention has a conceivable modification example, similarly to the guidance assistance system 100 in the first example embodiment of the present invention.

As an example, a guidance assistance system 201 in the second example embodiment of the present invention may be configured to include an input information reception unit 150 and a result output unit 160, as illustrated in FIG. 10. The input information reception unit 150 and the result output unit 160 have the same configurations as those of the input information reception unit 150 and the result output unit 160 provided in the guidance assistance system 100 in the modification example of the first example embodiment of the present invention.

In this example embodiment, the guidance assistance system 200 is described by taking, as an example, a case where evacuees are evacuated from an evacuation origin to an evacuation destination via an evacuation route. However, similarly to the guidance assistance system 100 in the first example embodiment, the guidance assistance system 200 in this example embodiment and its modification example are applicable to the case where the crowd of any number of people travels from the departure point to the destination via the predetermined travel route. In other words, even when the crowd travels from the departure point to the destination via the predetermined travel route, using the guidance assistance system 200 in this example embodiment allows the guide signs to be properly arranged at points having a high priority, or the like.

Although the present invention has been described with reference to example embodiments and examples thereof, it should be understood that the present invention is not limited to the above-described example embodiments. Various modifications apparent to those skilled in the art may be applied to the configuration and detail of the present invention within the scope of the present invention. The configuration in each of the example embodiments can be combined with each other within the scope of the present invention.

This application is based upon and claims the benefit of priority from Japanese Patent Application No. 2015-081701, filed on Apr. 13, 2015, the disclosure of which are incorporated herein by reference in their entirety.

REFERENCE SIGNS LIST 100, 101, 200, 201 Guidance assistance system
110 Deviation risk evaluation unit
120 Priority order determining unit
230 Arrangement selecting unit
150 Input information reception unit
160 Result output unit
500 Information processing device
501 CPU
502 ROM
503 RAM
504 Program
505 Storage device
506 Recording medium
507 Drive device
508 Communication interface
509 Communication network
510 Input-output interface
511 Bus

The invention claimed is:

1. A guidance assistance system comprising:
a memory configured to store instructions; and
at least one processor configured to execute the instructions to:
calculate a priority order to display a guide sign with respect to a plurality of predetermined points in a moving route using information related to the moving route and circumstances of the moving route, the guide sign being a sign to guide a crowd; and
control a display to display the moving route and emphasize a direction for guiding the crowd with the guide sign at a selected point of the moving route, the selected point being a point that is selected from the plurality of predetermined points in which the priority order is higher than a threshold value.

2. The guidance assistance system according to claim 1, wherein the display is provided in a mobile device.

3. The guidance assistance system according to claim 1, wherein the at least one processor is further configured to execute the instructions to:
calculate a deviation risk using the information related to the moving route and the circumstances of the moving route, the deviation risk representing an influence on a deviation of the crowd from the moving route at the plurality of predetermined points in the moving route; and
calculate the priority order to display the guide sign using the calculated deviation risk.

4. The guidance assistance system according to claim 1, wherein the plurality of predetermined points comprises either one or both of a confluence and a branch.

5. A guidance assistance method, the method comprising:
calculating, by at least one processor, a priority order to display a guide sign with respect to a plurality of predetermined points in a moving route using information related to the moving route and circumstances of the moving route, the guide sign being a sign to guide a crowd; and
controlling, by the at least one processor, a display to display the moving route and emphasize a direction for guiding the crowd with the guide sign at a selected point of the moving route, the selected point being a point that is selected from the plurality of predetermined points in which the priority order is higher than a threshold value.

6. The guidance assistance method according to claim 5, wherein the controlling the display comprises controlling a display provided in a mobile device.

7. The guidance assistance method according to claim 5, further comprising
calculating, by the at least one processor, a deviation risk using the information related to the moving route and the circumstances of the moving route, the deviation risk representing an influence on a deviation of the crowd from the moving route at the plurality of predetermined points in the moving route; and
using the calculated deviation risk to obtain the priority order.

8. The guidance assistance method according to claim 5, wherein, in controlling the display by the at least one processor, the point where the direction is emphasized with the guide sign is selected from the plurality of predetermined points including either one or both of a confluence and a branch.

9. A non-transitory program storage medium storing a computer program that causes a computer to execute:
calculating a priority order to display a guide sign with respect to a plurality of predetermined points in a moving route using information related to the moving route and circumstances of the moving route, the guide sign being a sign to guide a crowd; and
controlling a display to display the moving route and emphasize a direction for guiding the crowd with the guide sign at a selected point of the moving route, the selected point being a point that is selected from the plurality of predetermined points in which the priority order is higher than a threshold value.

10. The non-transitory program storage medium according to claim 9, wherein the computer program causes the computer to control a display provided in a mobile device.

11. The non-transitory program storage medium according to claim 9, wherein the computer program causes further the computer to execute
calculating a deviation risk using the information related to the moving route and the circumstances of the moving route, the deviation risk representing an influence on a deviation of the crowd from the moving route at the plurality of predetermined points in the moving route,
wherein the computer program causes the computer to calculate the priority order to display the guide sign using the calculated deviation risk.

12. The non-transitory program storage medium according to claim 9, wherein the computer program causes the computer to, in controlling the display, emphasize the direction as the guide sign at the point that is selected from the plurality of predetermined points including either one or both of a confluence and a branch.

* * * * *